United States Patent [19]

Kareman

[11] 3,938,251

[45] Feb. 17, 1976

[54] SABER OR JIG SAW WITH DEMOUNTABLE FOOT PLATE AND SHIELD

[75] Inventor: James Kareman, Bradley Beach, N.J.

[73] Assignee: The Raymond Lee Organization, Inc., a part interest

[22] Filed: Mar. 10, 1975

[21] Appl. No.: 556,829

[52] U.S. Cl. .................................... 30/376; 30/124

[51] Int. Cl.[2] .................... B27B 11/02; B27B 19/09

[58] Field of Search ............ 30/124, 166, 374, 375, 30/376, 392, 393, 394, 133; 83/98, 99, 100, 167

[56] References Cited

UNITED STATES PATENTS

| | | | |
|---|---|---|---|
| 3,087,519 | 4/1963 | McCarty | 30/376 |
| 3,303,861 | 2/1967 | Kane | 30/376 |
| 3,339,598 | 9/1967 | Frostad | 30/376 |
| 3,662,796 | 5/1972 | Batistelli | 30/124 X |

*Primary Examiner*—Al Lawrence Smith
*Assistant Examiner*—J. C. Peters

[57] ABSTRACT

A saber or jig saw is provided with a detachable hollow foot plate having a removable hollow transparent shield. The shield and plate collect saw dust and particles (produced during operation of the saw) for subsequent disposal. The plate can be adjusted to permit bevel cuts. The shield permits the user to closely observe the cutting action of the saw when in use and to guide the saw accordingly, thus minimizing the chances of eye injury which could otherwise result if the shield were not used.

4 Claims, 6 Drawing Figures

SABER OR JIG SAW WITH DEMOUNTABLE FOOT PLATE AND SHIELD

SUMMARY OF THE INVENTION

This invention is directed toward saws, for example jig saws or saber saws, which employ a vertically reciprocating elongated vertical cutting blade. Such saws produce and scatter large amounts of saw dust and particles when in use whereby subsequent extensive clean up operations are required. In addition, it is difficult for the user to observe the pattern of cut and guide the saw accordingly because of the accumulation of dust and particles on the work.

This invention provides a removable hollow foot plate with a demountable front disposed hollow transparent shield. The shield and foot plate, when secured in place on a saw of the type described, collect the dust and particles for subsequent disposal whereby a majority of clean up operations are essentially eliminated. The shield and foot plate further cooperate in such manner that the dust and particles do not accumulate around the blade and the user can easily observe the pattern of cut and guide the saw as desired.

DETAILED DESCRIPTION OF PREFERRED EMBODIMENTS

Figure 2:
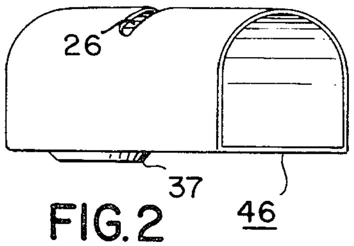
FIG. 2 is a side view of a transparent shield.
Figure 1:
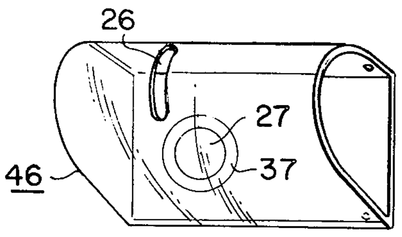
FIG. 1 is a perspective exploded view of the invention.
Figure 1:
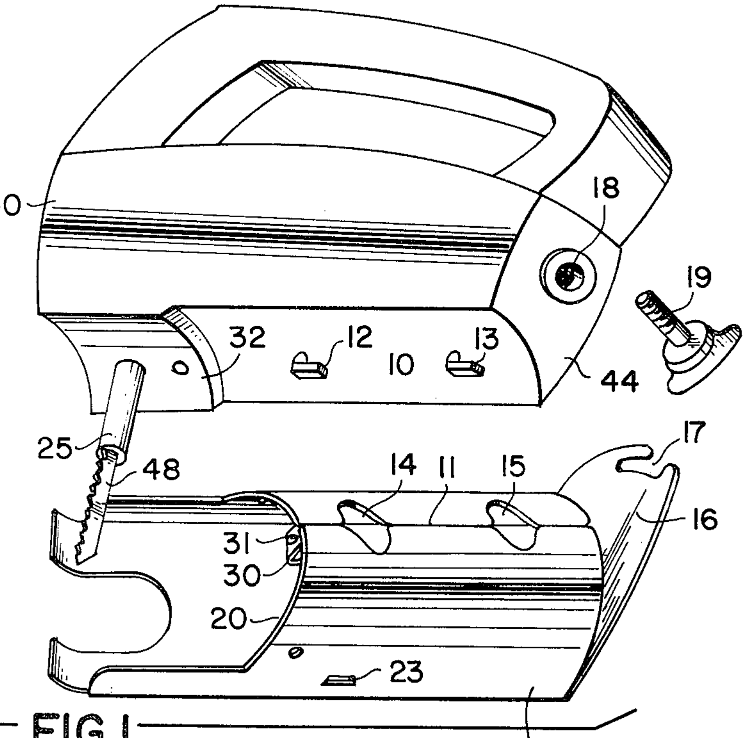
Figure 3:
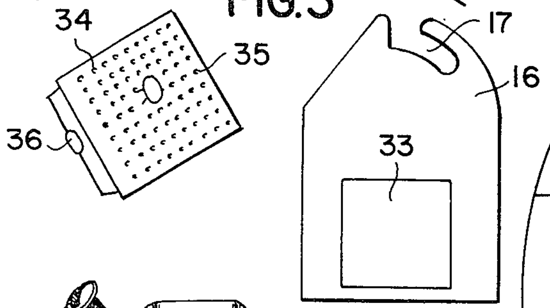
FIG. 3 is a partially exploded end view of the back plate.
Figure 5:
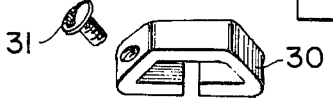
FIG. 5 is an exploded perspective view of a securing assembly for the bar section of a rip guide.
Figure 4:
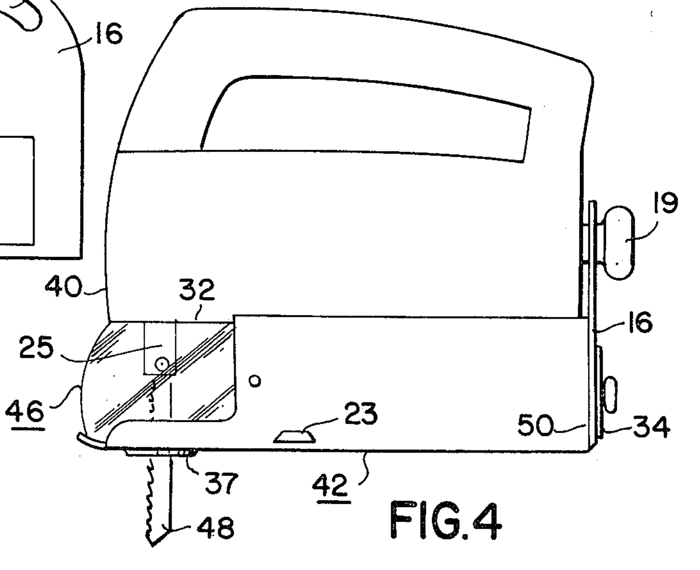
FIG. 4 is an assembled side view of the invention.
Figure 6:
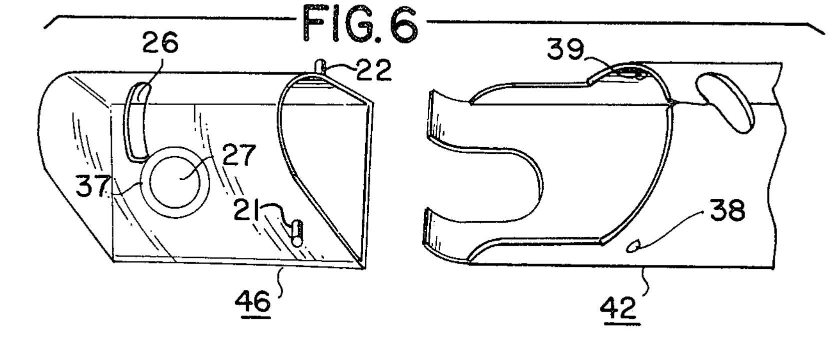
FIG. 6 is a perspective exploded view of certain modified parts used in the invention.

Referring now to FIGS. 1 – 6, rounded top section 11 of hollow foot plate 42 has spaced openings 14 and 15 on the top portion which engage spaced brackets 12 and 13 on the bottom surface 10 of housing 40 of the saw whereby the plate 42 is held removably in engagement with the housing. The back 44 of the housing has a threaded hole 18 exposed through opening 17 in back plate 46 of plate 42. Threaded key 19 engages hole 18 to lock the plate 42 in any angular position with respect to the housing which will permit bevel cuts up to 45° to be made.

Clear hollow plastic shield 46 is removably disposed in mouth 20 of plate 42 and fits snugly. Shield 46 can have tabs 21 and 22 engagable with holes 38 and 39 in the top surface of plate 42 to provide a more secure fit.

The shank 25 and blade 48 of the saw extend through a top elongated opening 26 and a bottom circular opening 27 in the shield. The plastic shield should be essentially the same thickness as plate 42 and should be somewhat flexible. Opening 27 has a peripheral lip of ridge 37 which is more flexible than the remainder of the shield. The lip drops slightly below the bottom surface of the plate 42 to enable the weight of the saw to provide enough pressure to squeeze the level of lip 37 even with the bottom surface of plate 42, thus providing a tight seal. The lip is of highly polished flexible smooth plastic to minimize friction.

Plate 16 has opening 33 removably closed by filter cap 34 which has small perforations 35 and is made of transparent plastic. Flexible tabs 36 on each side of cap 34 enable the cap to be easily installed and removed whereby accumulated waste material can be disposed of.

Securing assembly 30 for receiving the bar section of a rip guide receives the bar section of the guide and receives lock screw 31 to hold the section in plate. Openings 23 on opposite sides of the foot plate are used for receiving the guide section of the rip guide. Plugs can fit removably into these openings when the guide is not used.

Front end 32 of the bottom surface 10 of housing 40 is lower than the remaining portion to equalize the levels of the front end and remaining bottom surface when the foot plate is attached and avoids a gap when the shield is inserted.

If a space 50 is formed between plate 16 and the remainder of plate 42, a thin flat perforated plastic strip can be slid removably therebetween eliminating the use of cap 34.

In use, the air channeled from the fan in the upper housing to the cutting area through the openings in the bottom section of the upper housing and on the top section of the shield will pull in sawdust and perticles and force same to the rear of the plate 42. The perforations 35 provide proper air flow.

Since these particles are moved out of the shield, the user of the saw can closely observe the cutting action and can guide the saw accordingly.

While the invention has been described with detailed reference to the drawings, the protection sought is to be limited only by the terms of the claims which follow.

I claim:

1. In combination with a saw having a vertically reciprocating vertically elongated cutting blade and a housing with an exposed bottom surface and a rear surface with a threaded hole:
    a hollow foot plate having a front opening, spaced openings in its top surface, a horizontal bottom surface and a back having an opening;
    bracket means on said bottom surface of the housing detachably engaging said openings in the top surface of the foot plate whereby said back opening overlies said threaded hole;
    a threaded key extending through said back opening into the threaded hole to lock the foot plate in place; and
    a hollow transparent plastic shield sealed except for aligned top and bottom openings accommodating said blade and a rear opening detachably engagable with the front opening of said foot plate.

2. The combination of claim 1 wherein said spaced openings in the top surface of the foot plate are elongated to allow the foot plate to be rotated for bevel cuts up to 45° before the foot plate is locked in position by the key.

3. The combination of claim 2 wherein the bottom hole of the shield has a circular lip extending below the bottom surface of the shield and formed of yieldable material which slides over other surfaces with little friction.

4. The combination of claim 3 wherein the shield and foot plate have cooperating detachable engagement means.

* * * * *